B. R. WINGFIELD.
POWER TRANSMISSION TOOTHED GEARING.
APPLICATION FILED JUNE 5, 1918.
1,306,653.
Patented June 10, 1919.
6 SHEETS—SHEET 5.
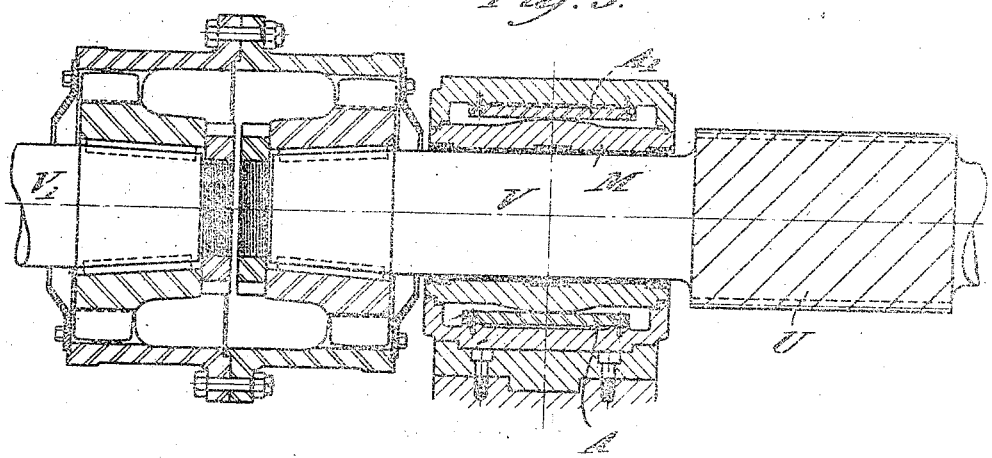
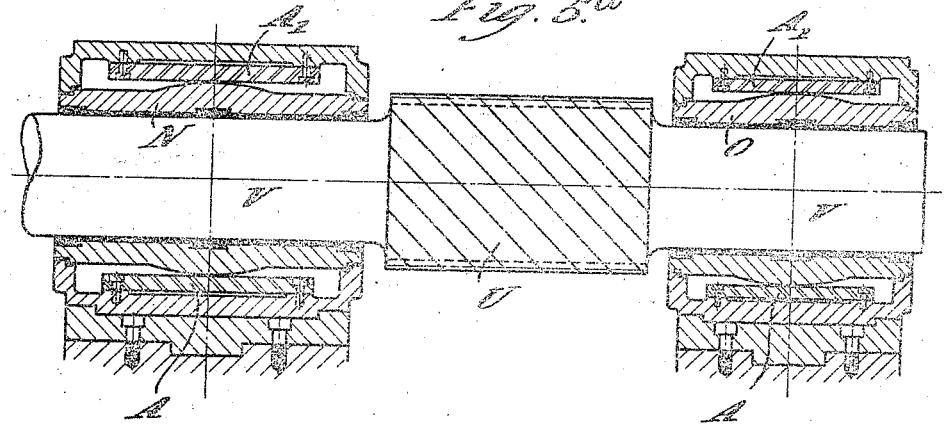

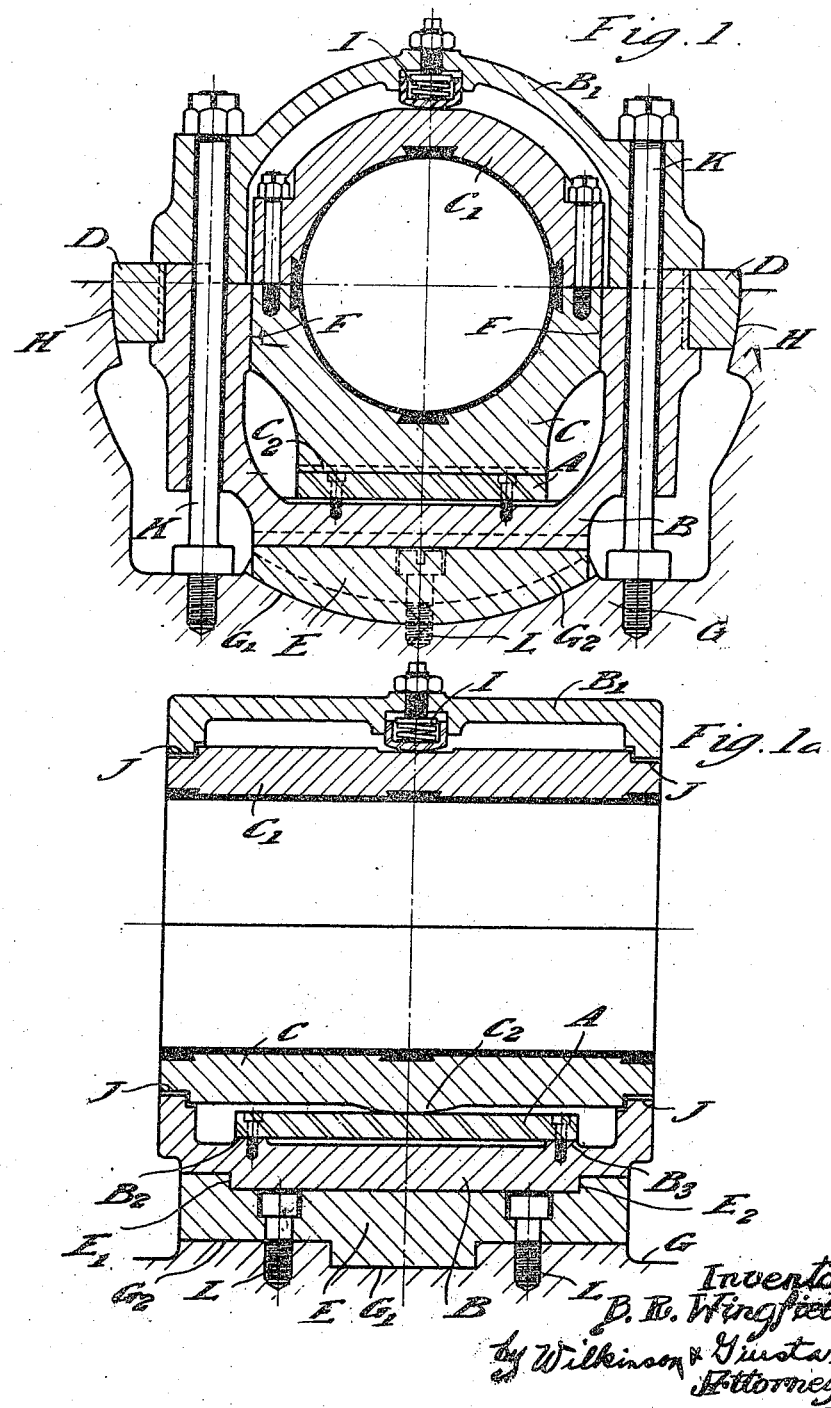

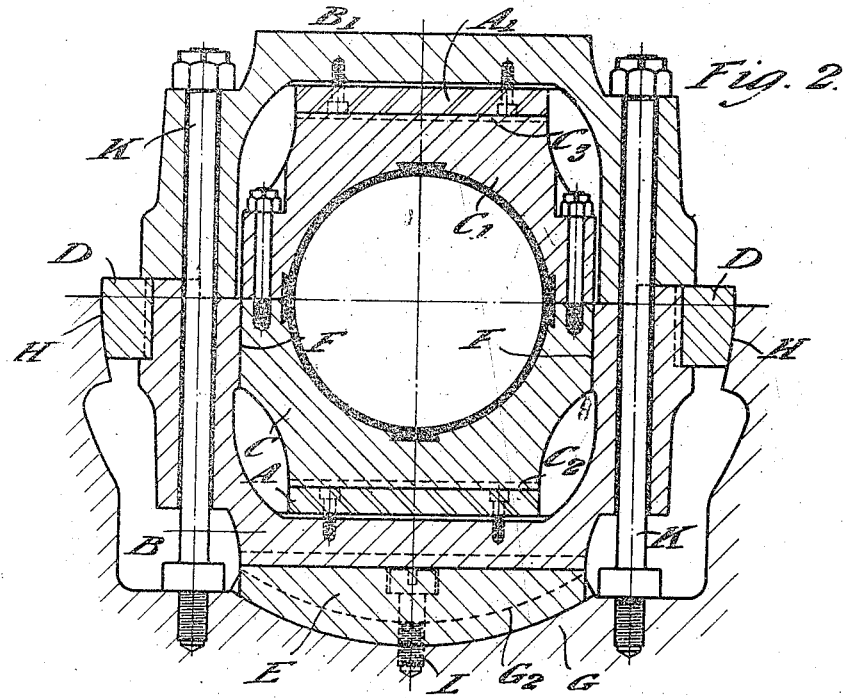
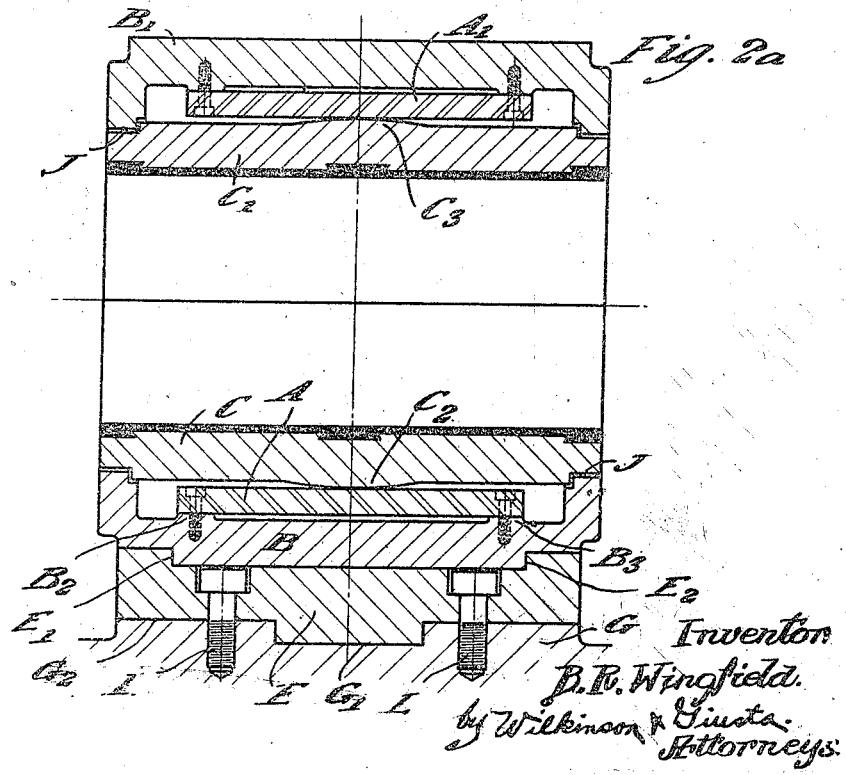

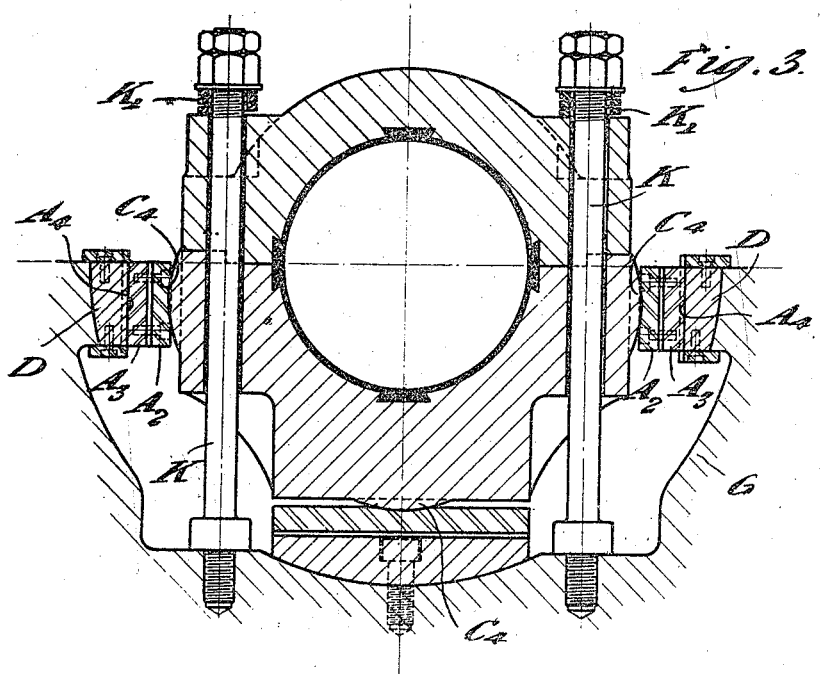
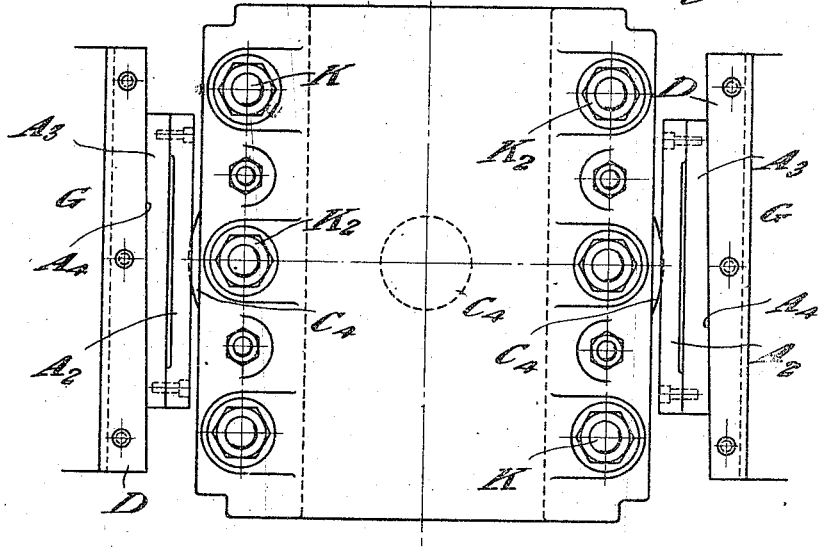

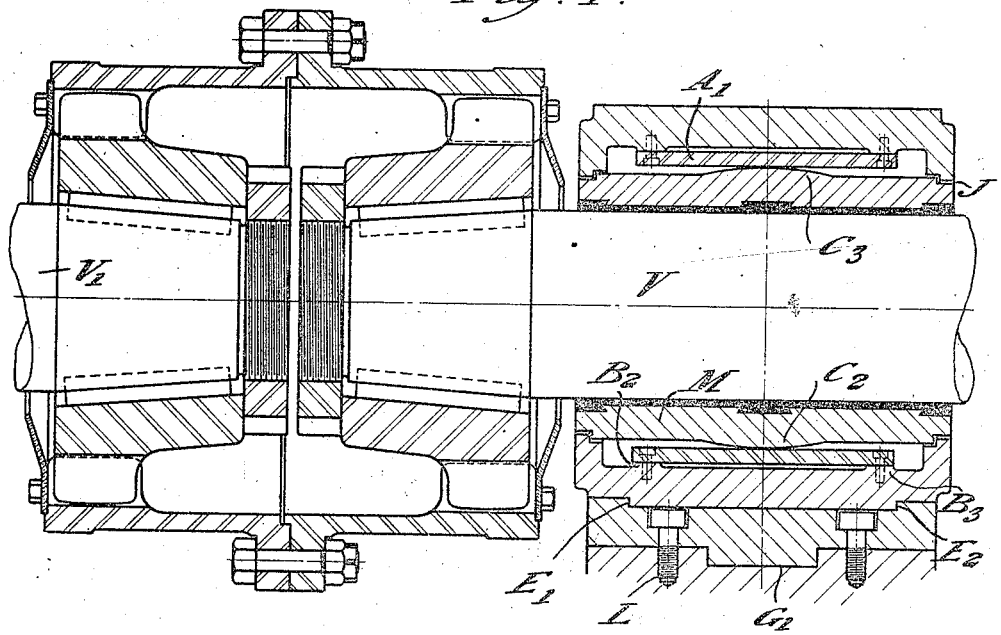
Fig. 4.
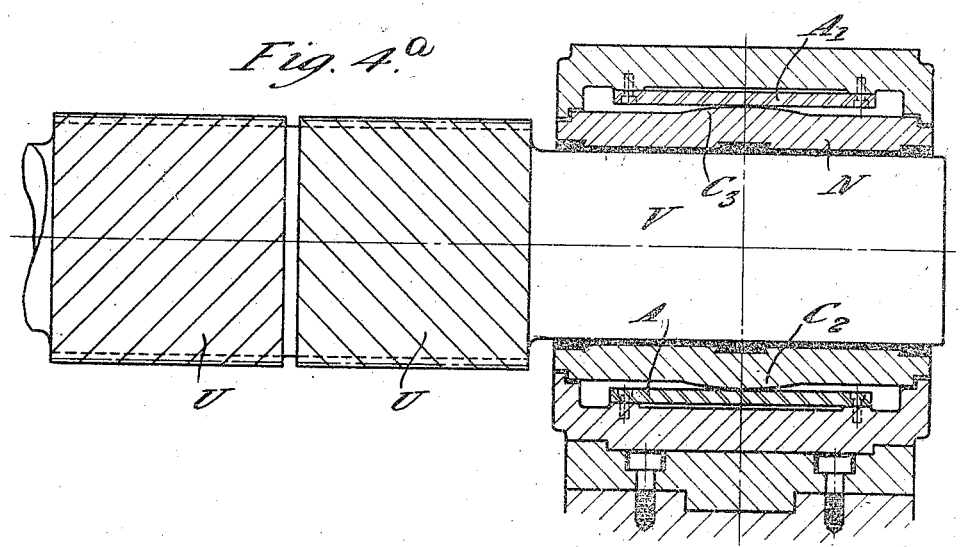
Fig. 4.ᵃ

B. R. WINGFIELD.
POWER TRANSMISSION TOOTHED GEARING.
APPLICATION FILED JUNE 5, 1918.
1,306,653.
Patented June 10, 1919.
6 SHEETS—SHEET 6.
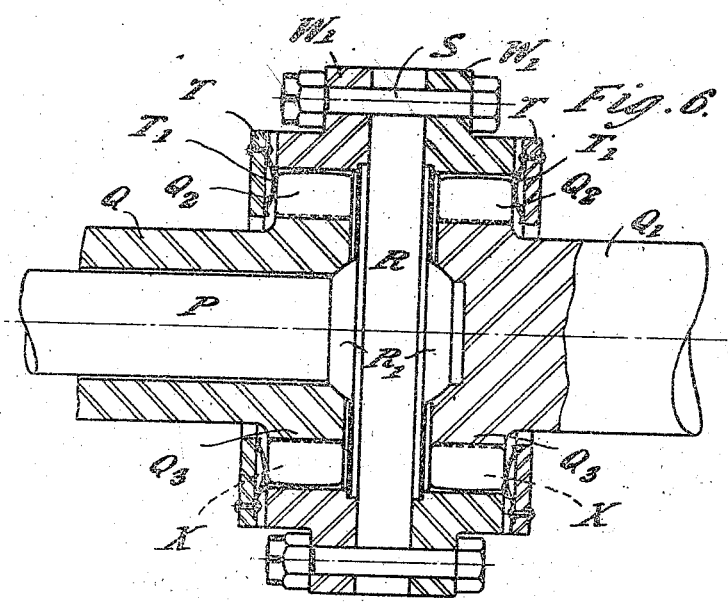
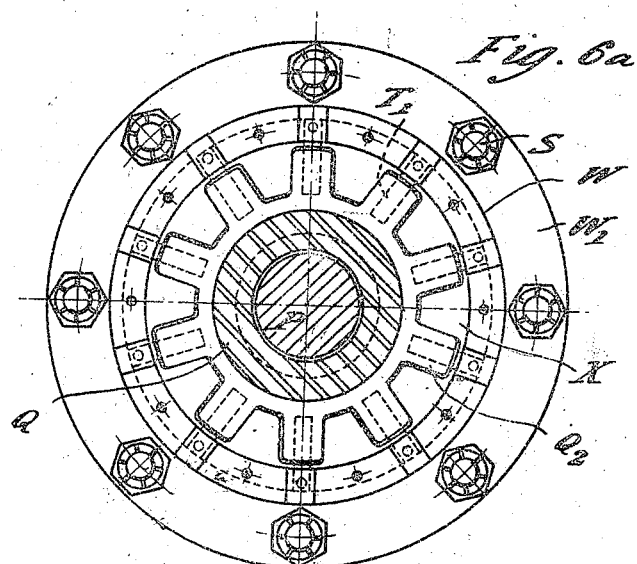
Inventor:
B. R. Wingfield.
by Wilkinson & Fisher
Attorneys.

UNITED STATES PATENT OFFICE.

BERNARD R. WINGFIELD, OF WEST DRAYTON, ENGLAND.

POWER-TRANSMISSION TOOTHED GEARING.

1,306,653.   Specification of Letters Patent.   Patented June 10, 1919.

Application filed June 5, 1918. Serial No. 238,349.

*To all whom it may concern:*

Be it known that I, BERNARD ROBERT WINGFIELD, a subject of the King of Great Britain, residing in West Drayton, England, have invented certain new and useful Improvements in and Relating to Power-Transmission Toothed Gearings, of which the following is a specification.

In power transmission toothed gearing with one or more trains of gears adapted more particularly to transmit power from machine shafts having a high speed of rotation, such as steam turbines, to shafts running at a lower speed, such as shafts of electric generators, propeller shafts of ships and the like, unavoidable inaccuracies in production and fitting may cause uneven distribution of load on the intermeshing teeth of such gears. It has, therefore, been previously proposed to support shafts in such a way that the intermeshing gear wheels can take up varying positions relatively to each other.

My invention relates to power transmission gearing which is of the kind above referred to and in which the driving or driven shaft or both shafts are supported as just described. It consists in an improved construction of a bearing that allows a gear wheel with its shaft supported therein to alter its position relatively to the gear wheel with which it is in mesh under the influence of the load on the gear teeth, and in improved means of connecting in certain cases the gear shaft to the driving shaft in order to give the gear shaft the necessary freedom of motion. The improved bearing may also be used with advantage for a shaft of a speed increasing gear.

According to the present invention I arrange the bearings of a shaft, which is to vary its position, in such a manner that the bearing bush or shell in which the shaft runs is formed with a flat bottom with a rounded projection around the center line of the bottom of the shell at right angles to the axis of the shafts in normal positions. The sides of the shell in the vertical planes parallel to the axis of the shafts are made flat. I support the rounded projection of the shell bottom on a diaphragm or spring plate, which may be rectangular or of any other shape, being in every case characterized by the absence of support of that portion on which the bearing shell rests. The spring plate I preferably mount in a housing in which the shell accurately fits with its vertical surfaces parallel to the axis of the shafts. This sliding fit enables the bearing bush to slide in the housing vertically corresponding to the resilience of the spring plate, while this method of mounting also enables the shell to tilt on the rounded projection as a pivot. The position of the bearing housing can be adjusted toward and away from the gear wheel with which the gear on the shaft carried in the bearings intermeshes.

Means are provided to effect such adjustment within the finest limits. At the same time means are provided to prevent the bearing housing from moving in the direction of the axis of the shaft. A bearing shell constructed as above described can be firmly held against a spring plate by a suitable holding down spring and screw at the top of the bearing which screw is provided to adjust the tension of the holding-down spring.

Bearings arranged according to this invention can be employed on shafts with two bearings only, one at each end, or on shafts with three bearings, one at each end and one in the center. In either case the gear shaft supported in the bearings will be connected to the power shaft by means of a suitable flexible coupling which has sufficient freedom of movement to allow the shaft to take up its natural position.

In the case of shafts for transmission of very large powers, in order to reduce the torsion on such a shaft to a minimum I make the pinion or gear shaft hollow and introduce therein a driving shaft, which may be rigidly connected to the power supplying shaft. The gear shaft is made in two portions and the driving shaft has a flange formed at its end which lies between the two portions of the gear shaft, each of the said portions having a flange that adjoins the flange of the driving shaft. The flanges of the two portions of the gear shaft bear against the flange of the driving shaft by means of spherical surfaces which allow the two portions of the gear shaft to swivel around the center flange of the driving shaft. The drive is transmitted to the two portions of the gear shaft from the center or driving shaft by means of bolts through the said three flanges. Each portion of the gear shaft is supported by bearings of the kind described above.

Variations in the bearing arrangements are possible without deviating from the scope of my invention. For example, a bearing shell, instead of being formed as above described with a flat bottom and rounded projection and flat sides, may be made cylindrical with spherical projections at the bottom and at the sides, the spherical bottom projection again resting on a spring plate or diaphragm and the spherical side projections bearing against sliding plates arranged between the shell and the housing in such a way that the plates can move up or down with the shell. These sliding plates can also be formed as spring plates characterized by the absence of support of the portion against which the shell rests. Again, a bearing shell may at the top also be formed flat and with a rounded projection coöperating with a spring plate.

I do not limit my invention to any particular type of gear, nor do I limit myself to any particular kind of teeth, but I preferably use double helical teeth, and in gears with drive from the center as above described I find it desirable to so cut the teeth that with the normal direction of rotation with double helical teeth the thrust is directed toward the center.

I will further describe my invention with reference to the accompanying drawings in which Figures 1 and 1ª are respectively, a cross and longitudinal section of a shaft bearing constructed according to this invention.

Figs. 2 and 2ª are similar views of a modified arrangement of the bearing.

Figs. 3 and 3ª are, respectively, a cross section and a plan of a bearing showing a further modification.

Fig. 4 is a sectional elevation of a pinion shaft supported on two spring bearings, and connected to a power-supplying shaft by a flexible coupling.

Fig. 5 is a sectional elevation of a pinion shaft with three spring-supported bearings.

Fig. 6 is a section showing a driving or power supplying shaft flexibly coupled to a pinion shaft, formed in two parts, and supported by spring bearings, and Fig. 6ª is an end view of the arrangement in Fig. 6, with parts omitted.

Referring to Figs. 1 and 1ª, and 2 and 2ª, $C$ $C_1$ represent the two parts of the bearing bush, the rounded projection being lettered $C_2$.

$A$ is the diaphragm or spring plate supported in the housing $B$, $B_1$ at $B_2$ and $B_3$. In Figs. 1 and 1ª at I is shown the spring with adjusting screw for holding down the bush, while in Figs. 2 and 2ª an alternative arrangement is shown in the use of a rounded projection $C_3$ and spring plate $A_1$ similar to the rounded projection $C_2$ and spring plate $A$ at the bottom. This alternative arrangement has the advantage that bearings so fitted are equally suitable whether the bearing pressure is directed downward or upward, while the arrangement in Figs. 1 and 1ª is only suitable for bearings with downward pressure.

At F are the vertical side surfaces of the bearing bush accurately fitting the housing. The housing B is supported on the plate E which has a flat top and circular bottom, the latter fitting and being suitably secured, as by screwbolts L, to the bearings-casing G into which it is also recessed. Housing B is recessed into plate E at $E_1$ and $E_2$ and thereby fixed axially, while plate E is recessed at $G_1$ into casing G. At right angles to the axis, housing B is adjustable in a lateral direction by means of the wedges D D with circular outer surfaces H H. These outer surfaces, the surface $G_2$ of the unrecessed portions of the casing G and surfaces H H have the same radius. Between housing B $B_1$ and bush C $C_1$ clearance is provided at J so that the bush can tilt slightly.

In each of the arrangements described with reference to Figs. 1 and 2, the housing B $B_1$ is secured to the casing G by means of bolts K, passing through clearance holes.

Figs. 3 and 3ª show a further alternative arrangement in which the bearing is mounted directly in the case G and is provided with rounded or spherical projections $C_4$ at the sides as well as at the bottom. The projections $C_4$ bear against members or plates $A_2$ capable of sliding on the guides $A_4$, with or without interposed plates $A_3$. The members $A_2$ may be spring plates supported as described above. The position of the bearings can be adjusted by means of the wedges D in directions at right angles to the sliding members $A_2$. The bearing is held to the case by means of bolts K fitted with springs $K_1$ under the nuts $K_2$ in order to give the necessary freedom of movement.

The arrangement shown in Fig. 3 may be modified by providing the top of the bearing also with a spring plate, the gear case being formed to coöperate therewith.

Fig. 4 illustrates pinions U formed in one with the shaft V which is carried on two spring supported bearings M and N, one at each end of the shaft, the bearings being arranged in accordance with Fig. 2; Fig. 5 shows pinion U on a pinion-shaft V flexibly coupled to a power-supplying shaft $V_1$ and carried on three spring supported bearings M, N, O constructed in accordance with Fig. 2 and disposed one at each end and one in the center.

Figs. 6 and 6ª show a pinion shaft made in two portions Q, $Q_1$ which would be supported in spring bearings constructed as shown for example in Figs. 2 and 2ª. The pinion shaft carries two half pinions which are not shown but may be formed integrally with the shaft. A driving or power-supplying shaft P traverses the shaft portion Q which is made hollow for the purpose. Forged on the end of the shaft P is a flange R which lies between the adjacent ends of the two shaft portions Q Q$_1$ and is coupled by means of bolts S to flanges W$_1$ formed on two coupling sleeves W, which are arranged one on either side of the end flange and provided with claws or teeth X which engage with claws or teeth Q$_2$ formed on coupling flanges Q$_3$ forged on the ends of the shaft portions Q, Q$_1$.

On either side of the end flange R spherical projections R$_1$ are provided around which the two shaft portions Q and Q$_1$ can swivel. In the direction of rotation for which the pinion is designed the axial thrust from both half pinions would be directed toward flange R and would be taken up by the spherical projections R$_1$. In the opposite direction of rotation the thrust would be controlled by the springs T$_1$ attached to the plates T fixed to the sleeves W.

Having thus described the nature of the said invention and the best means I know of carrying the same into practical effect, I claim:—

1. A bearing for supporting a driving or driven shaft, in which the bush of the bearing is formed with a flat bottom bearing face having on its underside a rounded projection that is supported on a diaphragm or spring plate, which is devoid of support in that portion on which the projection rests.

2. A bearing claimed in claim 1, in which the top bearing face of the bush is also furnished with a projection arranged to bear on a like supported diaphragm or spring plate.

3. A bearing as claimed in claim 1 or 2, in which the spring plate is mounted in a support provided with vertical guiding surfaces, the bush being formed with lateral bearing-faces, which are arranged in vertical planes parallel to the axis of the shaft in normal positions and adapted to slide on said guiding surfaces.

4. Power transmission toothed gearing as claimed in claim 3, in which the lateral bearing faces of the bush are also provided each with a spherical projection that bears against sliding plates arranged between the lateral bearing faces of the bush and the bearing casing or the housing.

5. Power transmission toothed gearing according to claim 4 in which the sliding plates have each the form of a spring plate.

6. Power transmission toothed gearing as claimed in claim 3, 4 or 5, in which means are provided for adjusting the bearing in directions at right angles to its lateral bearing-faces.

7. Power transmission toothed gearing as claimed in any of the claims 3–6, having means adapted to prevent the bearing housing from moving in the direction of the axis of the shaft therein.

In testimony whereof I have signed my name to this specification in the presence of two subscribing witnesses.

BERNARD R. WINGFIELD.

Witnesses:
   C. S. HOPKINS,
   W. I. SKERTEN.